United States Patent
Corbiere et al.

(10) Patent No.: US 11,128,646 B1
(45) Date of Patent: Sep. 21, 2021

(54) APPARATUS AND METHOD FOR CLOUD-BASED ACCELERATED FILTERING AND DISTRIBUTED AVAILABLE COMPUTE SECURITY PROCESSING

(71) Applicant: Trend Micro Incorporated, Tokyo (JP)

(72) Inventors: Zachery Corbiere, Austin, TX (US); Wei Lu, Cedar Park, TX (US)

(73) Assignee: Trend Micro Incorporated, Tokyo (JP)

( * ) Notice: Subject to any disclaimer, the term of this patent is extended or adjusted under 35 U.S.C. 154(b) by 422 days.

(21) Appl. No.: 15/954,030

(22) Filed: Apr. 16, 2018

(51) Int. Cl.
  *H04L 29/06* (2006.01)
(52) U.S. Cl.
  CPC ...... *H04L 63/1425* (2013.01); *H04L 63/0236* (2013.01); *H04L 63/1416* (2013.01); *H04L 63/20* (2013.01)
(58) Field of Classification Search
  CPC ............. H04L 63/1425; H04L 63/0236; H04L 63/1416; H04L 63/20
  See application file for complete search history.

(56) References Cited

U.S. PATENT DOCUMENTS

| | | | | |
|---|---|---|---|---|
| 7,095,716 B1 * | 8/2006 | Ke | ...................... | H04L 63/0272 370/230 |
| 10,243,988 B2 * | 3/2019 | Low | .................... | H04L 63/1416 |
| 10,264,020 B1 * | 4/2019 | Nanda | .................... | H04L 63/20 |
| 2003/0145228 A1 * | 7/2003 | Suuronen | ............ | H04L 63/1408 726/12 |
| 2006/0191008 A1 * | 8/2006 | Fernando | .............. | G06F 21/564 726/23 |
| 2009/0094697 A1 | 4/2009 | Provos et al. | | |
| 2012/0222087 A1 | 8/2012 | Huynh et al. | | |
| 2016/0323143 A1 | 11/2016 | Kim et al. | | |
| 2017/0006113 A1 * | 1/2017 | Singhal | .................. | H04L 69/22 |
| 2017/0195173 A1 * | 7/2017 | Izenberg | ............. | G06F 9/45558 |
| 2018/0302281 A1 * | 10/2018 | Khan | ...................... | H04L 67/34 |
| 2019/0149525 A1 * | 5/2019 | Gunda | .................. | H04L 9/0819 713/171 |
| 2019/0250941 A1 * | 8/2019 | Rooke | ..................... | G06F 8/451 |
| 2019/0319873 A1 * | 10/2019 | Shelar | ..................... | H04L 67/28 |
| 2020/0272730 A1 * | 8/2020 | Liang | ....................... | G06F 8/73 |

OTHER PUBLICATIONS

Fei Chen, et al. "Enabling FPGAs in the Cloud", May 2014, 10 sheets, Computing Frontiers '14, Cagliari, Italy.

* cited by examiner

*Primary Examiner* — Chau Le
*Assistant Examiner* — Han Yang
(74) *Attorney, Agent, or Firm* — Patrick D. Benedicto (57) ABSTRACT

One embodiment of the presently-disclosed invention relates to an intrusion prevention system that includes a plurality of FPGA instances and a plurality of compute instances in a cloud network. The plurality of FPGA instances perform pre-processing that determines whether data packets received from the network gateway are associated with suspicious flows. The data packets associated with the suspicious flows are communicated from the plurality of FPGA instances to a plurality of compute instances in the cloud network. The plurality of compute instances perform post-processing that determines whether a suspicious flow is malicious. Other embodiments, aspects and features are also disclosed.

16 Claims, 6 Drawing Sheets

APPARATUS AND METHOD FOR CLOUD-BASED ACCELERATED FILTERING AND DISTRIBUTED AVAILABLE COMPUTE SECURITY PROCESSING

BACKGROUND OF THE INVENTION

1. Field of the Invention

The present invention relates generally to computer security, and more particularly to methods and apparatus for inspecting network traffic flows.

2. Description of the Background Art

An intrusion prevention system can protect network segments during an attack because it operates on current data. As part of a multi-layered system of defenses, intrusion prevention systems often form the outermost layer and first line of defense. This is markedly different from intrusion detection systems, which monitor network traffic often through log data. That is, an intrusion detection system operates on past data, whereas an intrusion prevention system typically operates in real-time.

A network security device, such as an intrusion prevention or detection system, may employ different approaches to inspect network traffic for malicious data. For example, a network security device may employ pattern matching to inspect network traffic. As another example, some intrusion detection systems perform network traffic inspection using machine learning techniques. However, machine learning is highly difficult to use by intrusion prevention systems because of the very substantial resources required to inspect high volumes of network traffic in real-time.

SUMMARY

The presently-disclosed solution provides a two-stage hybrid (hardware and software) architecture that uses programmable integrated circuit chip instances, such as field programmable gate array (FPGA) instances, in a cloud network to pre-scan or pre-process all packets from a network gateway. Traffic flows determined to be clean or un-suspicious are allowed to pass to destination hosts without further inspection. However, when the pre-processing detects suspicious traffic flows, the suspicious flows are forwarded with pre-processing status data for further inspection to distributed agents in compute instances in the cloud network. The forwarding to the distributed agents is done intelligently based on available resources at the compute instances. The distributed agents may use the pre-processing status data to accelerate their further inspection.

One embodiment of the presently-disclosed invention relates to an intrusion prevention system that includes a plurality of FPGA instances in a cloud network which are communicatively coupled to a network gateway for a data network. Each FPGA instance includes an integrated circuit chip that is configured in the cloud network. The intrusion prevention system may further include a plurality of compute instances in the cloud network which are communicatively coupled to the plurality of FPGA instances.

Another embodiment of the invention relates to a method of inspecting network traffic by a cloud network. A plurality of data packets are received from a network gateway by a plurality of FPGA instances in a cloud network, FPGA instance comprising an integrated circuit chip that is configured in the cloud network. The plurality of FPGA instances perform pre-processing that determines whether data packets received from the network gateway are associated with suspicious flows. The data packets associated with the suspicious flows are communicated from the plurality of FPGA instances to a plurality of compute instances in the cloud network. The plurality of compute instances perform post-processing that determines whether a suspicious flow is malicious.

These and other embodiments, aspects and features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

An intrusion prevention system is often deployed at the perimeter of a network or network segment, in-line with network traffic. Network traffic passes through the intrusion prevention system before proceeding further into the network. Accordingly, and to avoid or minimize latency, an intrusion prevention system is expected to operate as a real-time system. Even deep packet inspection must proceed quickly in order not to impede the flow of packets. Further complicating the speed requirement is the fact that an intrusion prevention system needs to track the network traffic and payloads for many (in the millions) different sessions or flows simultaneously.

An example commercially-available intrusion prevention system is the 7500NX intrusion prevention system from TREND MICRO TIPPINGPOINT. The 7500NX intrusion prevention system supports network traffic at 20 Gb/s, can handle 60,000,000 concurrent flows, and has less than 40 microseconds of latency per packet. The aforementioned data rates limit the amount of time that an intrusion prevention has to identify malicious traffic. High-performance intrusion prevention systems seek to avoid methods of inspection that impede network flow.

In general, intrusion prevention systems can match Internet Protocol (IP) addresses, host names, and Uniform Resource Locators (URLs) to known whitelists and blacklists. Additionally, intrusion prevention systems can match byte sequences or strings within packet payloads to known malicious patterns. This matching can include application of regular expressions in order to match patterns more loosely. An intrusion prevention system may perform all of these operations with minimal state in a single pass over the traffic, in order to guarantee desired data rate and latency performance. As will be more apparent below, embodiments of the present invention may be incorporated into suitable new or pre-existing intrusion prevention systems.

Figure 1:
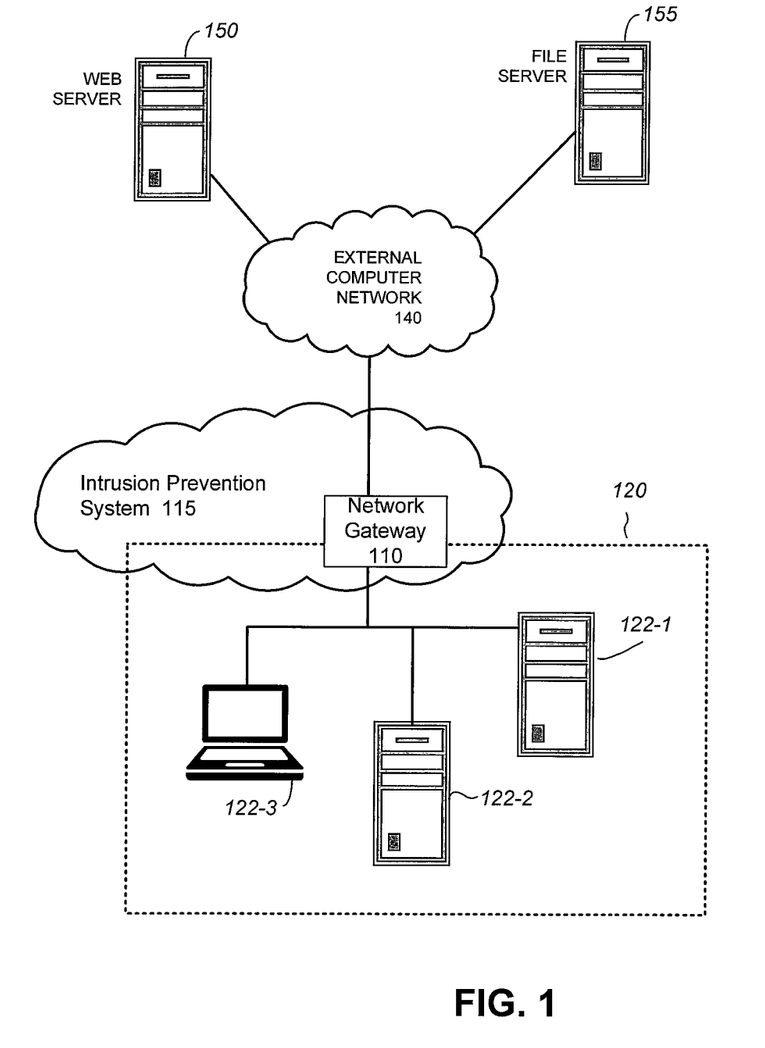
FIG. 1 depicts a data network (or network segment) with an intrusion prevention system in accordance with an embodiment of the present invention.

FIG. 1 depicts a data network (or network segment) 120 with a network gateway 110 in accordance with an embodiment of the present invention. The computer network 120 may include a plurality of network devices 122 (i.e., 122-1, 122-2, 122-3, etc.), such as end user computers, servers, routers, etc.

As shown, a network gateway 110 may be implemented as an in-line cloud-based gateway at the perimeter of the data network 120. As further shown, the network gateway 110 may utilize a cloud-based intrusion prevention system (IPS) 115 to defend the perimeter of the computer network 120 against intrusion by malicious traffic.

In one implementation, the IPS 115 inspects all network traffic going into or out of the data network 120. For example, the IPS 115 may inspect packets communicated between an end user computer 122-3 of the data network 120 and a server on an external computer network 140 (which may be the Internet, for example). For example, the server may be a web server 150 or a file server 155. The IPS 115 may be configured to inspect the network traffic flows in real-time to look for various malware, including those created using exploit kits, for example.

Exemplary Apparatus

Figure 2:
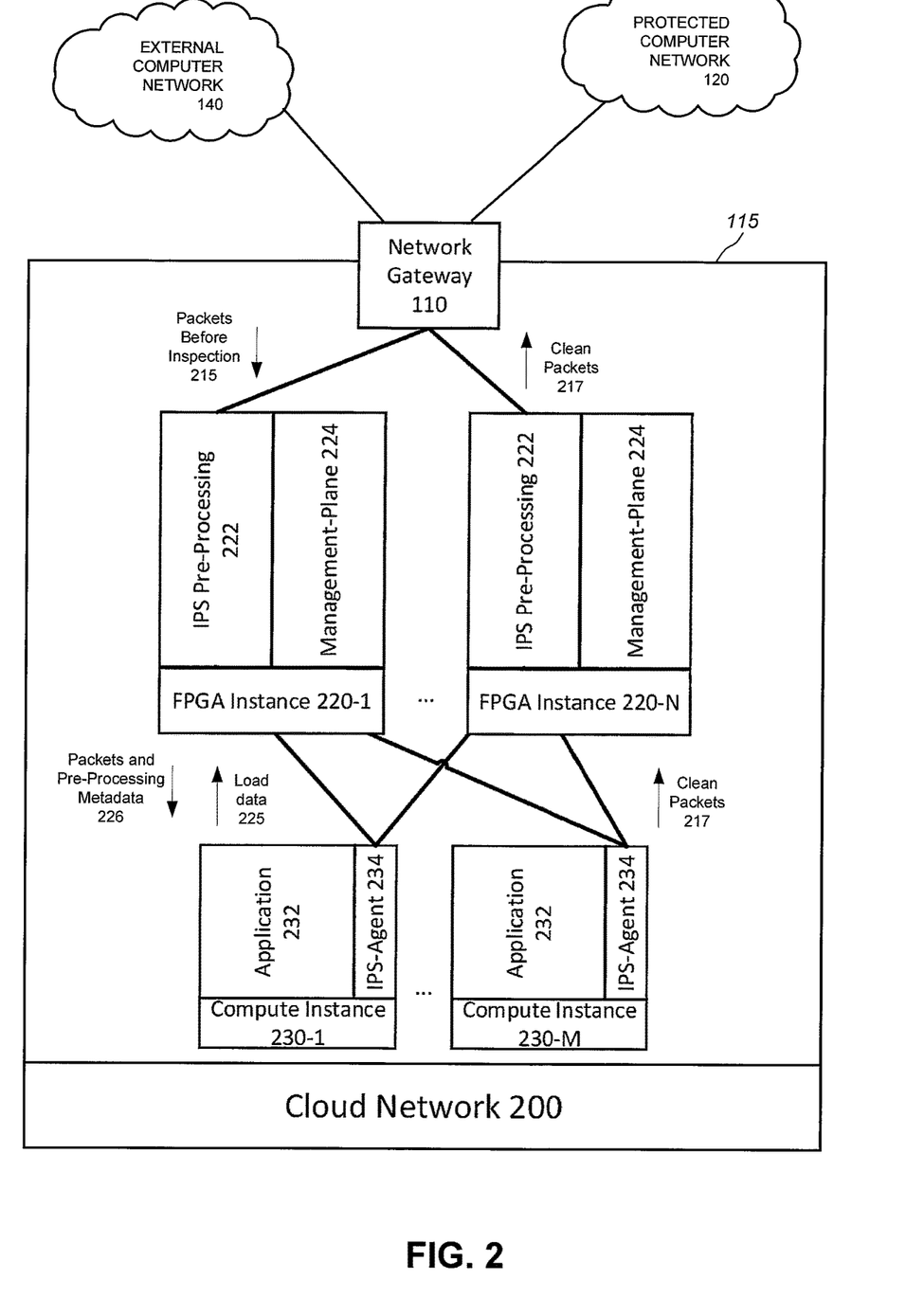
FIG. 2 shows an exemplary apparatus for a cloud-based intrusion prevention system in accordance with an embodiment of the present invention.

FIG. 2 shows an exemplary apparatus for a network gateway 110 with an intrusion prevention system (IPS) 115 in accordance with an embodiment of the present invention. As shown, the network gateway 110 and the IPS 115 may both be implemented on a cloud network 200, which may be, for example, a virtual private cloud (VPC) of a corporation or other organization. Such a virtual networking infrastructure may be, for example, a VPC which is provided by AMAZON AWS, or a VNET which is provided by MICROSOFT AZURE.

The network gateway 110 may be in-line between the protected computer network 120 and the external network 140 such that the IPS 115 may protect the computer network 120 against malicious intrusion. As depicted in FIG. 2, the IPS 115 may be implemented using FPGA (field programmable gate array) instances 220-1 . . . 220-N and compute instances 230-1 . . . 230-M on the cloud network 200.

FPGA Instances

In accordance with an embodiment of the invention, a plurality of FPGA instances 220-1 . . . 220-N are utilized to perform processing steps for initial inspection of data packets in a distributed manner. Each FPGA instance 220 may be a hardware-accelerated programmed instance that employs an FPGA in hardware form (i.e. an FPGA integrated circuit or FPGA chip). In an exemplary implementation, the circuit design for the FPGA instance 220 is uploaded to the cloud network 200. An FPGA chip in the cloud network 200 may then be electronically programmed with the circuit design. The FPGA instance 220 utilizes the electronically-programmed FPGA chip (or chips) to accelerate compute-extensive processing steps. As depicted in FIG. 2, each FPGA instance 220 may include electronically-programmed circuitry to implement an IPS pre-processing module 222 and a management plane module 224.

IPS Pre-Processing Modules

Figure 3A:
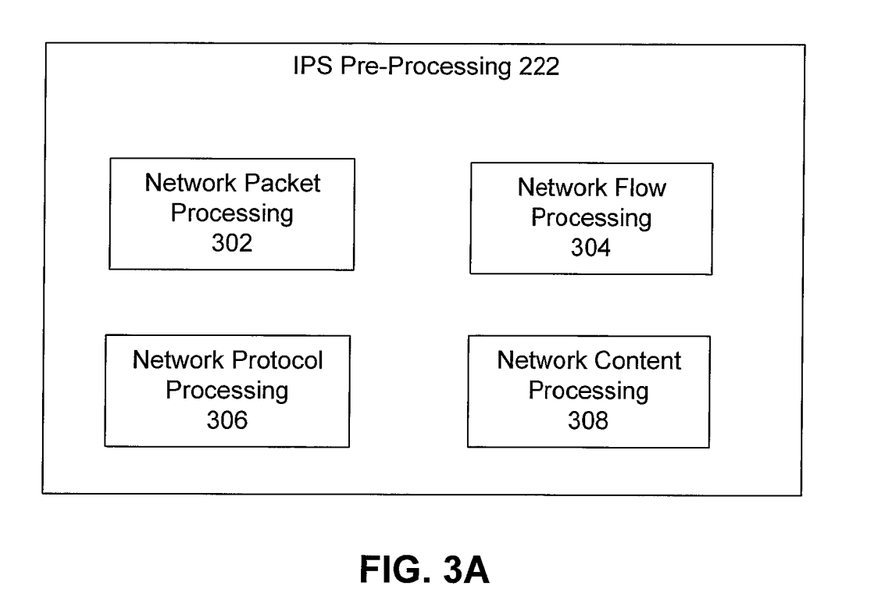
FIG. 3A is a block diagram showing components of a pre-processing module of an FPGA instance in accordance with an embodiment of the present invention.

The IPS pre-processing modules 222-1 . . . 222-N receive raw packets 215 from the network gateway 110 and perform pre-processing (i.e. the initial inspection processing) of the packets for the IPS 115. The pre-processing effectively filters the packets so that only the packets that warrant further analysis are forwarded with pre-processing metadata 226 to appropriate IPS agents 234-1 . . . 234-M for final inspection. The pre-processing may include 1) network packet processing, 2) network flow processing, 3) network protocol processing and 4) network content processing. These processing operations by an IPS pre-processing module 222 may be performed by a network packet processing module 302, a network flow processing module 304, a network protocol processing module 306, and a network content processing module 308, which are depicted in FIG. 3A.

The network packet processing module 302 receives raw network packets 215 from the network gateway 110. The network packet processing module 302 may parse, normalize and classify the raw packets 215. If packets are indicated as clean (non-suspicious) by the IPS pre-processing module 222, then the network packet processing module 302 returns the clean packets 217 to the network gateway 110 for forwarding to their destination in the protected data network 120.

The network flow processing module 304 associates individual data packets with network traffic flows. In addition, the network flow processing module 304 may parse, normalize and classify the flows. The state of the flows may also be tracked by the network flow processing module 304.

The network protocol processing module 306 identifies layered protocols in the network traffic flows. In addition, the network protocol processing module 306 may identify protocol keys and boundaries.

The network content processing module 308 matches content patterns in one or more of the layered protocols in the network traffic flows against pre-defined pattern rules. This pattern matching is performed to detect suspicious traffic flows.

Once IPS pre-processing is done, if a suspicious traffic flow is detected, then the FPGA instance 220 will forward the pre-processed packets for the suspicious flow, along with the pre-processing status data (pre-processing metadata) 226 from the IPS pre-processing module 222, to a selected IPS agent 234 running in a compute instance 230. Note that under certain network and application conditions, the FPGA instance 220 might not be able to complete some of its processing steps. In that case, the FPGA instance 220 will convey such conditions as part of the pre-processing status data.

Management Plane Modules

Figure 3B:
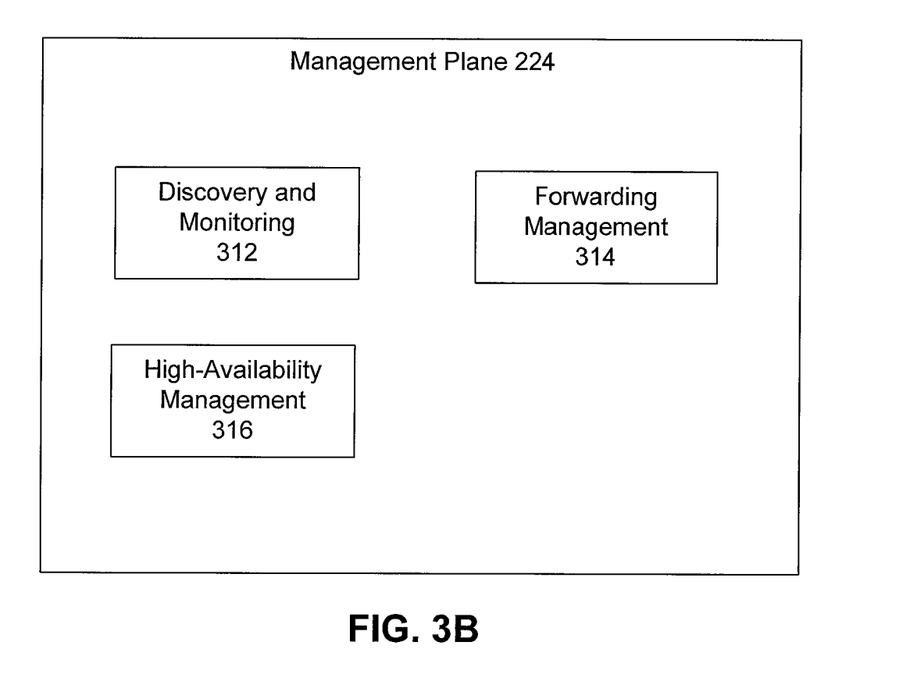
FIG. 3B is a block diagram showing components of a management plane module of an FPGA instance in accordance with an embodiment of the present invention.

Together the management plane modules 224 on FPGA instances 220-1 . . . 220-N operate cooperatively to implement a management plane that performs various management operations. The management operations performed by the management plane may include: 1) discovering and monitoring of compute instances 230-1 . . . 230-M within the cloud network 200; 2) management of forwarding rules for pre-processed packets from FPGA instances 220-1 . . . 220-N to IPS agents 234 in compute instances 230-1 . . . 230-M; and 3) optionally monitor and manage high-availability pairs of FPGA instances, if such are implemented. These management operations by the management plane may be performed by a discovery and monitoring module 312, a forwarding management module 314, and an optional high-availability management module 316, which are depicted in FIG. 3B.

The discovery and monitoring module 312 discovers or identifies the individual compute instances 230-1 . . . 230-M. In addition, the discovery and monitoring module 312 also receives load data 225 from the compute instances 230-1 . . . 230-M. Using the load data 225, the discovery and monitoring module 312 monitors compute resource consumption and the status of IPS agent 234 availability on the compute instances 230-1 . . . 230-M.

The forwarding management module 314 manages the forwarding of pre-processed packets using forwarding rules which are applied to route the packets with pre-processing metadata 226 to IPS agents 234. The forwarding management module 314 calculates and correlates compute resource consumption by the compute instances 230-1 . . . 230-M and the status of IPS agents 234 on those compute instances. This resource utilization and status information may then be used by the forwarding management module 314 to update the forwarding rules so as to efficiently utilize the IPS agents 234 on the compute instances 230-1 . . . 230-M.

Various algorithms may be used by the forwarding management module 314 to update the forwarding rules using the resource utilization and status information. A simple example is a forwarding rule that sends pre-processed packets to the IPS agent 234 on the compute instance 230 with the highest available idle compute resources. Other forwarding rules may depend on a combination of available idle compute resources and the percentage of compute resources being consumed by the IPS agents 234 on the compute instances 230-1 . . . 230-M. Other forwarding rules may depend on a combination of compute instance processing power, compute resource consumption history of applications, and criticality of the applications 234 on the compute instances 230-1 . . . 230-M.

Regarding high-availability pairs of FPGA instances, if such are implemented, then the high-availability management module 316 tracks the health and status of FPGA instances which are configured as high-availability pairs. The high-availability management module 316 may also manage networking routes in the network cloud to modify the routing to adjust for an FPGA instance that has problems or is down.

Compute Instances

In accordance with an embodiment of the invention, a plurality of compute instances 230-1 . . . 230-M are utilized to perform processing steps for final inspection of forwarded pre-processed packets in a distributed manner. Each compute instance 230 is a cloud-based programmed instance. As depicted in FIG. 2, each compute instance 230 may execute one or more applications 232 and an IPS agent 234.

IPS Agents

Figure 3C:
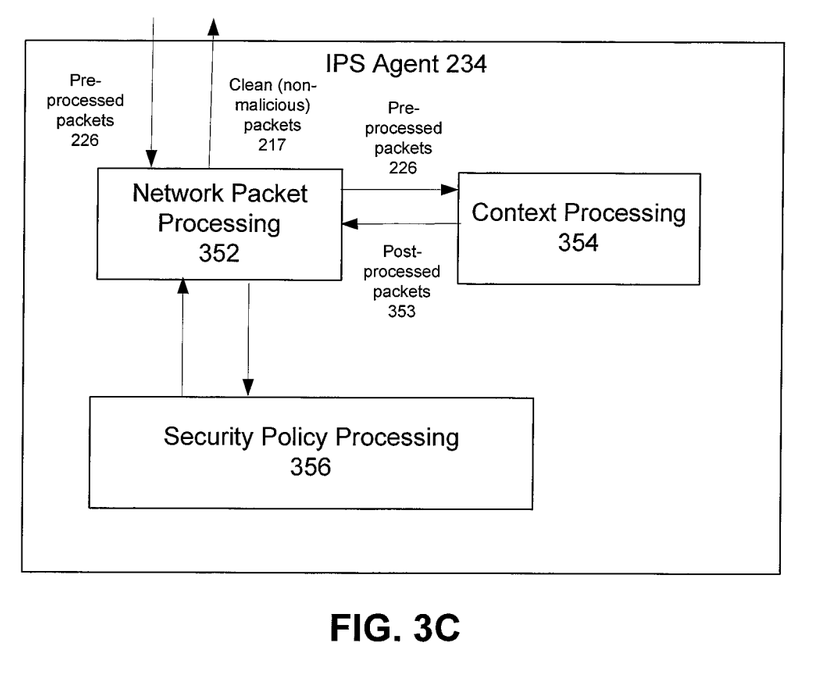
FIG. 3C is a block diagram showing components of an IPS agent of a compute instance in accordance with an embodiment of the present invention.

The IPS agents 234 on the compute instances 230-1 . . . 230-M perform the final inspection processing steps on pre-processed packets forwarded by the FPGA instances 220-1 . . . 220-N. The final inspection processing may include 1) network packet processing, 2) network and application context processing, and 3) security policy processing. These processing operations by an IPS agent 234 may be performed by a network packet processing module 352, a context processing module 354, and a security policy processing module 356, which are depicted in FIG. 3C.

Network Packet Processing by the IPS Agent

The network packet processing module 352 of the IPS agent 234 receives pre-processed network packets 226 from the FPGA instances 220-1 . . . 220-N. The network packet processing module 352 parses the pre-processed packets before network and application context processing is performed by the context processing module 354. In addition, after the network and application context processing, the network packet processing module 352 relays the post-processed packets to the security policy processing module 356.

Network and Application Context Processing by the IPS Agent

The context processing module 354 of the IPS agent 234 receives the parsed pre-processed packets and checks their pre-processing status, such as whether or not the pre-processing is complete or incomplete. The context processing module 354 performs context processing (also referred to as "post-processing") of the packets, including those with incomplete preprocessing. (When the pre-processing status data indicates that the pre-processing is incomplete, then the context processing module 354 may complete the pre-processing prior to performing the context processing.)

The context processing module 354 analyzes packets of a suspicious flow using an appropriate hosted application 232 and the operating environment on the compute instance 230. The hosted application 232 may be one that matches the type of network traffic flow. For example, for web (i.e. http) traffic, the application 232 may be a web browser.

The context processing may determine statistical features or behavior of the suspicious flow. The pre-processing status data may provide statistical features obtained during pre-processing that is useful to accelerate the context processing.

Post-processing status data is generated based on the context processing. The post-processing status data may be passed from the context processing module 354 to the security policy processing module 356.

Security Policy Processing by the IPS Agent

The security policy processing module 356 of the IPS agent 234 receives the post-processing status data (post-processing results). The security policy processing module 356 checks the post-processing status data against security policy rules.

If there are no matching policy rules such that a clean flow is indicated, then the clean (non-malicious) packets 217 may be relayed to the network gateway 110. The network gateway 110 may then forward the clean packets 217 to their destination in the protected network 120.

On the other hand, if there are matching policy rules such that a malicious flow is indicated, then the security policy processing module 356 may then determine one or more security actions associated with the matching policy rules. The security policy processing module 356 may then perform the security action(s).

For example, a security action may block a network traffic flow of packets when the post-processing status indicates that the network traffic flow is malicious. Blocking the network traffic flow may include quarantining packets of the network traffic flow, preventing packets of the network traffic flow from propagating in the computer network, preventing packets of the network traffic flow from being received by a computer in the data network 120, or other ways of stopping the network traffic flow from harming the data network 120. An additional security action may involve logging data relating to the identified traffic flow.

Exemplary Method

Figure 4:
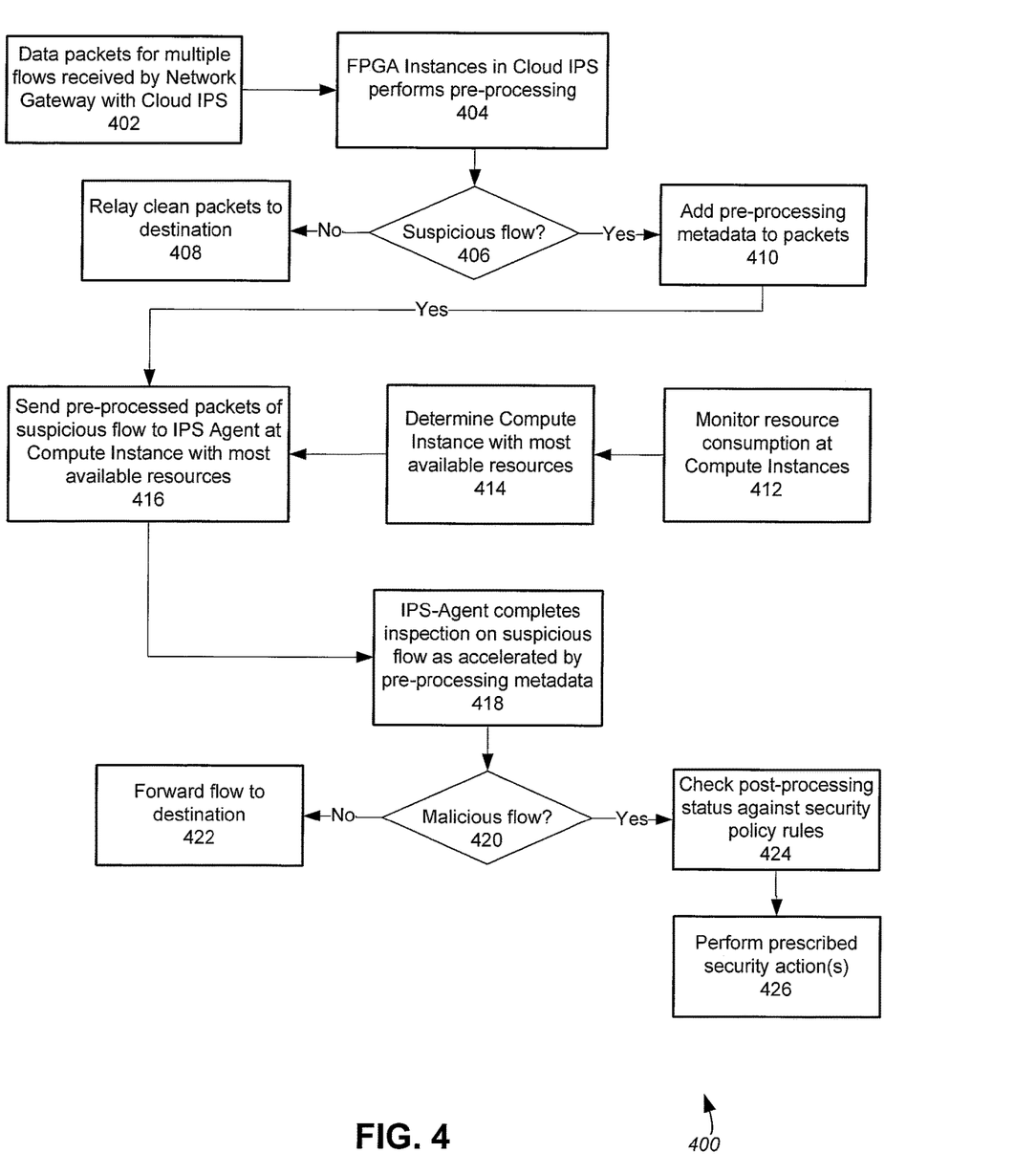
FIG. 4 is a flow diagram of an exemplary method of cloud-based accelerated filtering and distributed available compute security processing in accordance with an embodiment of the present invention.

FIG. 4 is a flow diagram of an exemplary method 400 of cloud-based accelerated filtering and distributed available compute security processing in accordance with an embodiment of the present invention. The method 400 may be performed by the intrusion prevention system (IPS) 115 as implemented with components depicted in FIG. 2, for example.

Per block 402, data packets of various network traffic flows are received by a network gateway 110, such as that depicted in FIG. 2, for example. As one example, the data packets of a network traffic flow may comprise data packets received over a TCP/IP (transmission control protocol/internet protocol) connection by a web client from a web server. In an exemplary implementation, as shown in FIG. 2, the network gateway 110 may be implemented in a cloud network 200.

Note that data packets for a very large number of network traffic flows may be received by the network gateway 110. For example, the network gateway 110 for a large data network 120 may receive a very large number (tens of thousands, for example) of such network traffic flows at the same time.

Per block 404, IPS pre-processing modules 222 implemented in FPGA instances 220-1 . . . 220-N within the cloud network 200 may perform pre-processing of the data packets. As described above, the pre-processing may include 1) network packet processing, 2) network flow processing, 3) network protocol processing and 4) network content processing. The pre-processing may perform pattern matching using regular expressions, for example. The pre-processing may be performed in an accelerated manner due to the implementation of the IPS pre-processing modules 222 in the hardware circuitry of the FPGA instances 220-1 . . . 220-N within the cloud network 200. The pre-processing generates and outputs pre-processing status data. The pre-processing status data indicates whether or not the data packet is associated with a network traffic flow that is suspicious (i.e. potentially malicious).

Per block 406, a determination is made as to whether the pre-processing status data indicates a suspicious flow. For data packets where the pre-processing status data indicates a non-suspicious flow, then the clean (non-suspicious) data packets may be relayed by the network gateway 110 to its destination in the data network 120 per step 408. On the other hand, if the pre-processing status data indicates that the data packet is associated with a flow which is suspicious, then the method 400 moves forward to block 410.

Per block 410, the pre-processing status data may be added as pre-processing metadata to the packets of the suspicious flow. The pre-processing metadata may include protocol data and content data that are obtained during the pre-processing.

Per block 416, the packets with pre-processing metadata 226 are then sent to a selected IPS agent 234 at a compute instance 230. In an exemplary implementation, the compute instance 230 to which the pre-processed packets 226 are sent may be selected as one with the most available compute resources. For example, the management plane 224 may monitor the resource consumption at the compute instances 230-1 . . . 230-M per block 412 and then determine the compute instance 230 with the most available resources per block 414.

Per block 418, the IPS agent 234 uses the application 232 (which may be pre-provisioned on that instance) completes the inspection by deeper analysis of the pre-processed packets of the suspicious flow. In one exemplary implementation of deeper analysis, the IPS agent 234 examines, using a virtual machine or "sand box", execution "behavior" performed by the suspicious flow in relation to the specific application 232. In another exemplary implementation, the IPS agent 234 may perform the deeper analysis using a machine learning model. The pre-processing metadata may include statistical features which may be used to accelerate this analysis. For example, the pre-processing metadata may provide some of the statistical features that are used to generate a feature vector associated with the suspicious flow, and a machine learning model may be applied to the feature vector to determine whether or not the suspicious flow is malicious.

Per block 420, based on the analysis results, a determination is made as to whether or not the suspicious flow is malicious. If the flow is determined to not be malicious (i.e. determined to be clean), then the clean packets 217 associated with that low may be relayed to the network gateway 110 for forwarding to their destination in the protected data network 120 per block 422. Otherwise, per block 424, post-processing status is checked against security policy rules, and, per block 426, prescribed security action(s) is(are) performed.

Exemplary Apparatus with IPS Broker

The solution architecture described above in relation to FIG. 2 utilizes a first type of compute instances 230 which hosts an application 232 and a pre-provisioned IPS agent 234. However, in certain systems, the IPS agent 234 may not be pre-provisioned on a compute instance. For example, some compute instances may not be capable of pre-provisioning the IPS agent 234 in addition to the application 232. As another example, some compute instances may have exhausted their compute resources such that there is insufficient compute resources for the perform post-processing of packets in a timely manner.

Figure 5:
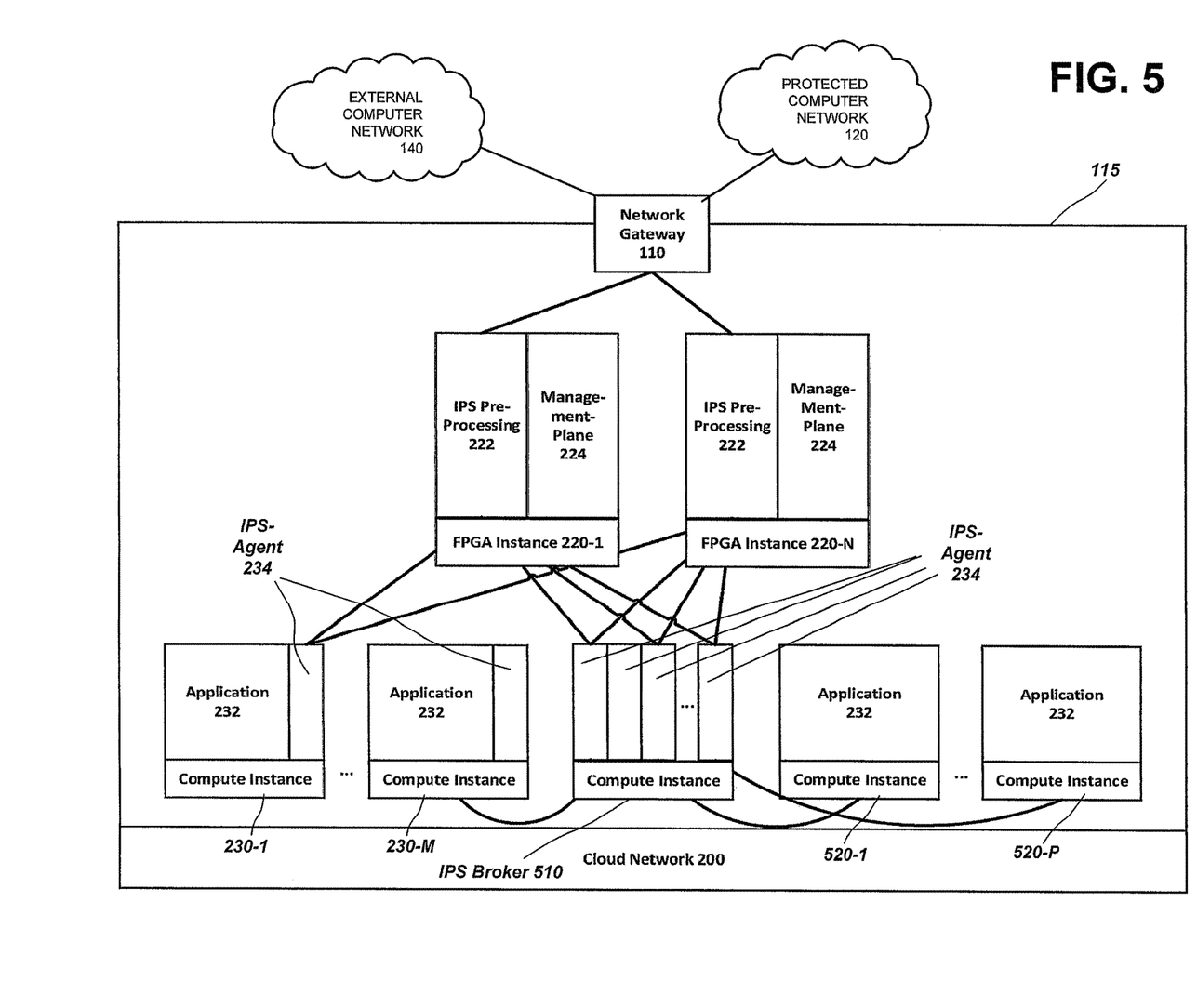
FIG. 5 shows an exemplary apparatus for a cloud-based intrusion prevention system which uses an IPS broker in accordance with an embodiment of the present invention.

FIG. 5 shows an exemplary apparatus for a cloud-based intrusion prevention system 115 which has an extended solution architecture in accordance with an embodiment of the present invention. As depicted, the extended solution architecture uses an IPS broker 510 which is a second type of compute instance in the cloud network 200. The IPS broker 510 hosts a plurality of IPS agents 234 for use with compute instances which are dedicated to applications 232 but do not have a pre-provisioned IPS agent 234.

For example, some compute instances 520-1 . . . 520-P may be incapable of pre-provisioning the IPS agent 234 in addition to the application 232. In that case, each one of those compute instances 520-1 . . . 520-P may utilize an IPS agent 234 hosted by the IPS broker 510 for post-processing of packets in relation to the application 232 hosted on the compute instance 520.

As another example, compute instance 230-M may have a pre-provisioned IPS agent 234. However, the compute instance 230-M may have exhausted its compute resources such that insufficient compute resources are available to perform post-processing of packets. In that case, an IPS agent 234 hosted by the IPS broker 510 may be used for post-processing of packets in relation to the application 232 hosted on the compute instance 230-M.

CONCLUSION

While specific embodiments of the present invention have been provided, it is to be understood that these embodiments are for illustration purposes and not limiting. Many additional embodiments will be apparent to persons of ordinary skill in the art reading this disclosure.

What is claimed is:

1. An intrusion prevention system for protecting a data network, the intrusion prevention system comprising:
a plurality of field programmable gate array instances in a cloud network which are each communicatively coupled to a network gateway for the data network, each field programmable gate array instance in the cloud network comprising an integrated circuit chip that is configured in the cloud network by uploading a circuit design for the field programmable gate array instance to the cloud network, followed by electronically programming the integrated circuit chip with the circuit design, wherein the plurality of field programmable gate array instances are electronically configured to perform pre-processing that determines whether data packets received from the network gateway are associated with suspicious flows;
a plurality of compute instances in the cloud network which are communicatively coupled to the plurality of field programmable gate array instances, wherein the plurality of compute instances are each programmed to perform post-processing that determines whether a suspicious flow is malicious; and
a management plane module configured in each said field programmable gate array instance, wherein the management plane module comprises a forwarding management module which is configured to apply forwarding rules that use resource utilization and status information for the plurality of compute instances to manage forwarding of the data packets associated with suspicious flows to the plurality of compute instances;
a plurality of applications hosted by the plurality of compute instances; and
an intrusion prevention system agent which is provisioned in each said compute instance, wherein the intrusion prevention system agent in a compute instance uses a hosted application in the compute instance to detect malicious behavior by the suspicious flow.

2. The intrusion prevention system of claim 1 further comprising:
a pre-processing module configured in each said field programmable gate array instance.

3. The intrusion prevention system of claim 2, wherein the pre-processing module comprises:
a network packet processing module which is configured to receive the data packets from the network gateway, parse the data packets, and return clean packets to the network gateway; and
a network flow processing module which is configured to associate the data packets to network traffic flows.

4. The intrusion prevention system of claim 3, wherein the pre-processing module further comprises:
a network content processing module which is configured to match content patterns in the network traffic flows against pre-defined pattern rules so as to detect suspicious flows.

5. The intrusion prevention system of claim 1, wherein the management plane module comprises:
a discovery and monitoring module which is configured to identify the plurality of compute instances and monitor the plurality of compute instances, including receiving load data from the plurality of compute instances.

6. The intrusion prevention system of claim 1, wherein the management plane module further comprises a high-availability management module which is configured to track status of field programmable gate array instances which are configured as high-availability pairs.

7. The intrusion prevention system of claim 1, wherein the suspicious flow comprises web traffic, and the hosted application comprises a web browser.

8. The intrusion prevention system of claim 1, wherein the intrusion prevention system agent comprises:
a network packet processing module which is configured to receive the data packets with pre-processing metadata from one or more pre-processing modules; and
a context processing module which is configured to analyze the data packets in context of the hosted application to detect the malicious behavior by the suspicious flow.

9. A method of inspecting network traffic by a cloud network, the method comprising:
receiving a plurality of data packets from a network gateway by a plurality of field programmable gate array instances in the cloud network, each field programmable gate array instance in the cloud network comprising an integrated circuit chip that is configured in the cloud network by uploading a circuit design for the field programmable gate array instance to the cloud network, followed by electronically programming the integrated circuit chip with the circuit design;
the plurality of field programmable gate array instances performing pre-processing that determines whether data packets received from the network gateway are associated with suspicious flows;
managing forwarding of the data packets associated with the suspicious flows from the plurality of field programmable gate array instances to a plurality of compute instances in the cloud network by applying forwarding rules that use resource utilization and status information for the plurality of compute instances;
the plurality of compute instances performing post-processing that determines whether a suspicious flow is malicious; and
intrusion prevention system agents in the plurality of compute instances using hosted applications to detect malicious behavior by the suspicious flows.

10. The method of claim 9, wherein said pre-processing comprises parsing the data packets, associating the data packets to network traffic flows, and matching content patterns in the network traffic flows against pre-defined pattern rules so as to detect the suspicious flows.

11. The method of claim 10 further comprising:
identifying and monitoring the plurality of compute instances, including receiving load data from the plurality of compute instances.

12. The method of claim 9, wherein the suspicious flow comprises web traffic, and the hosted applications comprise a web browser.

13. The method of claim 9, wherein the intrusion prevention system agents receive the data packets with pre-processing metadata and analyze the data packets in context of the hosted applications to detect the malicious behavior.

14. A network gateway provisioned in a cloud network, the network gateway including an intrusion prevention system for protecting a data network, wherein the intrusion prevention system comprises:
a plurality of programmable integrated circuit chip instances in the cloud network which are communicatively coupled to the data network, each programmable integrated circuit chip instance in the cloud network comprising an integrated circuit chip that is configured in the cloud network by uploading a circuit design for the field programmable gate array instance to the cloud network, followed by electronically programming the integrated circuit chip with the circuit design;

a plurality of compute instances in the cloud network which are communicatively coupled to the plurality of programmable integrated circuit chip instances;

a management plane module configured in each said programmable integrated circuit chip instances, wherein the management plane module comprises a forwarding management module which is configured to apply forwarding rules that use resource utilization and status information for the plurality of compute instances to manage forwarding of the data packets associated with suspicious flows to the plurality of compute instances;

a plurality of applications hosted by the plurality of compute instances; and an intrusion prevention system agent which is provisioned in each said compute instance, wherein the intrusion prevention system agent in a compute instance uses a hosted application in the compute instance to detect malicious behavior by the suspicious flow.

15. The network gateway of claim 14, wherein the plurality of programmable integrated circuit chip instances are electronically configured to perform pre-processing that determines whether data packets received from the network gateway are associated with the suspicious flows.

16. The network gateway of claim 15, wherein the plurality of compute instances are each programmed to perform post-processing that determines whether a suspicious flow is malicious.

* * * * *